(12) United States Patent
Ghannam et al.

(10) Patent No.: US 9,988,001 B2
(45) Date of Patent: Jun. 5, 2018

(54) FLEXIBLE CONTOUR MANAGING LICENSE PLATE BRACKET

(71) Applicant: FORD GLOBAL TECHNOLOGIES, LLC, Dearborn, MI (US)

(72) Inventors: Mahmoud Yousef Ghannam, Canton, MI (US); Swadad A. Carremm, Canton, MI (US); Jayagopal Appukutty, Troy, MI (US); Roy Joseph Scott, Saline, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 13 days.

(21) Appl. No.: 14/868,779

(22) Filed: Sep. 29, 2015

(65) Prior Publication Data

US 2017/0088065 A1    Mar. 30, 2017

(51) Int. Cl.
G09F 7/00 (2006.01)
B60R 13/10 (2006.01)
F16M 13/02 (2006.01)

(52) U.S. Cl.
CPC .......... B60R 13/105 (2013.01); F16M 13/02 (2013.01); B60R 13/10 (2013.01)

(58) Field of Classification Search
None
See application file for complete search history.

(56) References Cited

U.S. PATENT DOCUMENTS 1,936,711 A * 11/1933 Doughty ............... B60R 13/105
40/200
4,314,417 A  2/1982 Cain
4,917,426 A * 4/1990 Copp .................... B60R 13/105
293/142
6,681,507 B1 * 1/2004 Lieziert ................... G09F 21/04
40/200
8,191,944 B2  6/2012 Rinklin
9,463,829 B2 * 10/2016 Colombo .............. B60R 13/005
2007/0028490 A1 * 2/2007 Beer ..................... B60R 13/105
40/209
2015/0232130 A1 * 8/2015 Colombo .............. F16B 5/0657
403/14

FOREIGN PATENT DOCUMENTS

CN        2666743 Y      12/2004
CN      202098364 U       1/2012
CN      103568989 A       2/2014
JP     2015024706 A       2/2015

OTHER PUBLICATIONS

English machine translation of CN103568989A.
English machine translation of CN202098364U.
English machine translation of CN2666743Y.
English machine translation of JP2015024706A.

* cited by examiner

*Primary Examiner* — Kristina N Junge

(74) *Attorney, Agent, or Firm* — Jason Rogers; King & Schickli PLLC

(57) ABSTRACT

A motor vehicle license plate mounting bracket includes a substantially planar body defining an A surface and an opposite B surface and one or more resilient members disposed on the body B surface. The bracket body further includes a sidewall having one or more resiliency-imparting notches or grooves therein. Fascia assemblies including the license plate mounting bracket are described.

17 Claims, 5 Drawing Sheets

FLEXIBLE CONTOUR MANAGING LICENSE PLATE BRACKET

TECHNICAL FIELD

This disclosure relates generally to motor vehicle license plate brackets. The disclosure relates more particularly to a flexible, single tool contour-managing license plate bracket for mounting to a vehicle fascia.

BACKGROUND

In most jurisdictions, motor vehicles are required by law or regulation to display a license plate providing vehicle identification information. Some but not all jurisdictions require display of license plates on both the front and the rear of the vehicle. Other jurisdictions do not require displaying a license plate on the front of the vehicle. In turn, requirements for vehicle front pedestrian protection systems such as pedestrian protection sensors and impact dissipating structures vary by jurisdiction. Some jurisdictions require vehicle front pedestrian protection sensors and/or other protective measures, others do not.

Most typically, the function of displaying a license plate is provided by a bracket attached to or integrally formed in an A surface of a vehicle bumper, or to an A surface of a fascia associated with the vehicle bumper. Because of varying jurisdictional requirements for license plate display and pedestrian protection sensors, designing vehicle license plate brackets presents a number of unique engineering challenges.

Specifically, implementation of such license plate brackets, particularly those integrated in the vehicle fascia, is challenging at least because of issues such as compatibility of bracket material with fascia material and also aesthetic and structural design limitations on bracket size, thickness, and weight. Also, the profile and contours of a vehicle fascia B surface can be complex, and vary from vehicle model to vehicle model. Thus, different tooling is required for different brackets to be attached to different fascia. Moreover, because of the differences in jurisdictional requirements, it is desirable to provide at least a front license plate bracket that does not leave any print or effect on the vehicle fascia A surface for jurisdictions that do not require front license plate display. While this can be accomplished by providing a fascia that includes an integral surface to which a license plate bracket can be attached, this undesirably increases infrastructure (tooling) and other manufacturing costs because different fascia must be provided for vehicles intended for different jurisdictions. These costs must be passed on to the consumer.

Still more, typically pedestrian protection sensors (where implemented) are mounted in or on the vehicle fascia. The presence or absence of a license plate bracket may alter signal acquisition by such sensors, thus requiring different calibration procedures, testing, and otherwise increasing complexity and associated cost in accordance to whether a license plate bracket is present or not.

To solve these and other problems, the present disclosure relates to a license plate bracket of relatively simple structure that is advantageously made to be attached to any vehicle fascia regardless of jurisdictional requirements for front license plate display and pedestrian protection measures.

SUMMARY

In accordance with the purposes and benefits described herein, in one aspect a motor vehicle license plate mounting bracket is described. The bracket includes a substantially planar body defining an A surface and an opposite B surface. One or more resilient members are disposed on the body B surface.

In embodiments, the one or more resilient members each include an arcuate body attached at opposed edges thereof to the body B surface. The arcuate body may include one or more resiliency-imparting notches or grooves therein. In an embodiment, the body B surface includes a single resilient member disposed on the B surface. In another embodiment, the body includes a pair of resilient members. In embodiments, the bracket body includes a sidewall having one or more resiliency-imparting notches or grooves therein.

In another aspect, a fascia assembly for a motor vehicle is described including a fascia panel and a license plate mounting bracket as described above secured to a fascia panel A surface. The one or more resilient members define a spaced relationship between the fascia A surface and the body B surface.

In the following description, there are shown and described embodiments of the disclosed license plate bracket. As it should be realized, the license plate bracket and elements thereof are capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed license plate bracket, and together with the description serve to explain certain principles thereof. In the drawing.

Reference will now be made in detail to embodiments of the disclosed license plate bracket, examples of which are illustrated in the accompanying drawing figures.

DETAILED DESCRIPTION

Preliminarily, the description that follows is primarily directed for purposes of example to a license plate bracket that is attached to a front fascia of a vehicle. However, the skilled artisan will readily appreciate that the described bracket can be attached to any desired portion of the vehicle without modification, such as a rear fascia, a vehicle side portion, etc. Therefore, these descriptions should not be taken as limiting.

Figure 1:
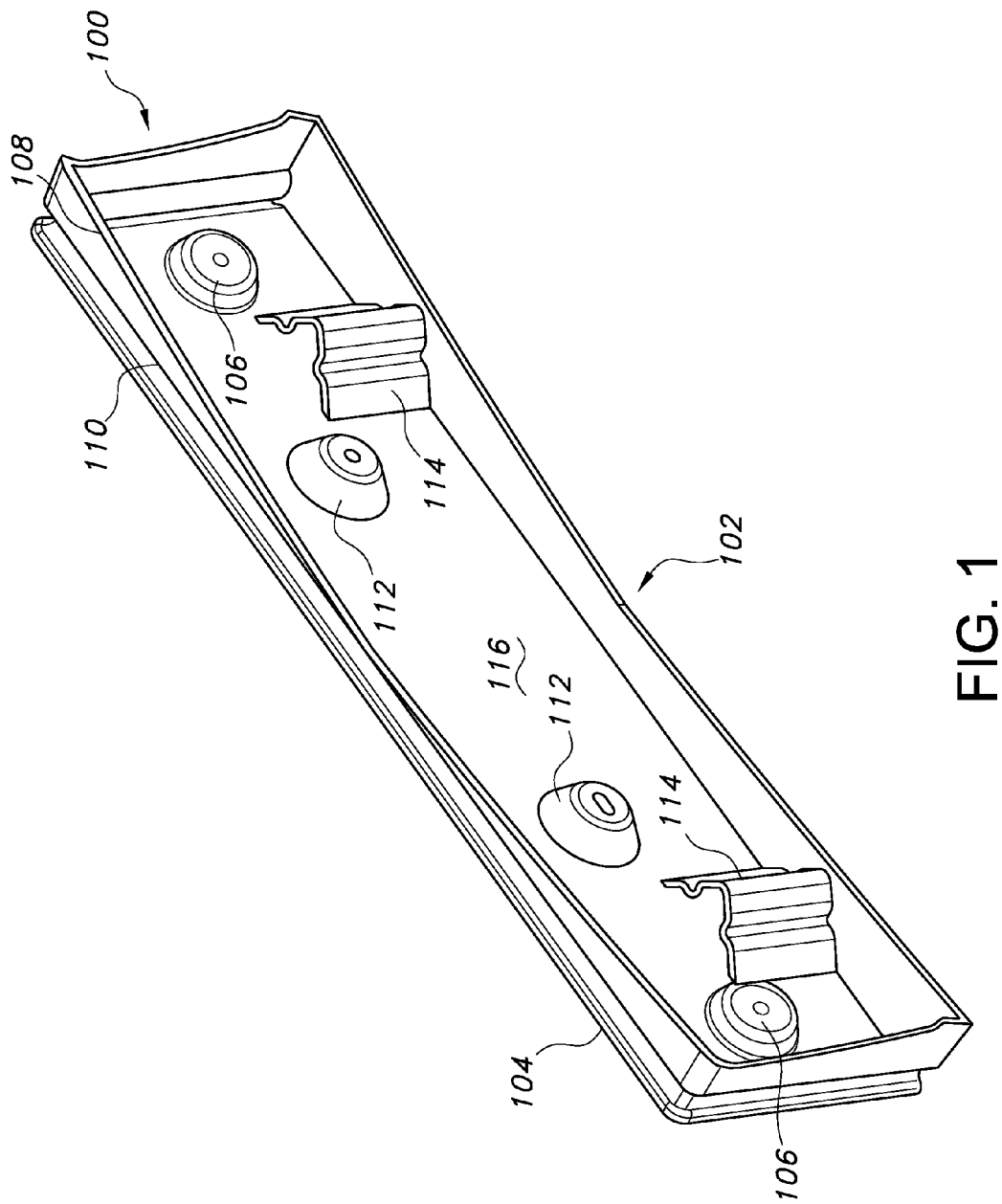
FIG. 1 is a rear perspective view of a license plate bracket according to the present disclosure.

Reference is now made to FIG. 1 illustrating a license plate bracket 100 according to the present disclosure. The bracket 100 includes a body 102 having a length dimension, a height dimension, and a depth dimension (see arrows) defining an A surface 104 to which a license plate (not shown) may be secured by fasteners attaching to one or more cooperating apertures 106. Of course, any suitable method of attaching a license plate to the bracket A surface 104 is contemplated, such as screws, snaps, clamps, clips, slots into which edges of the license plate may be inserted, combinations, and others.

The bracket 100 includes a side wall 108 including one or more notches or grooves 110 defined therein, the purpose of which will be described in greater detail below. One or more mounting apertures 112 are provided to allow fastening the bracket 100 to a vehicle fascia (not shown) such as by suitable fasteners.

The bracket 100 also includes one or more resilient members 114 disposed on a B surface 116 thereof, and defining a spaced distance between the bracket B surface 116 and a vehicle fascia (not shown in this view) to which the bracket is attached. As will be appreciated, the resilient members 114 may be attached to the bracket B surface 116 by any suitable method, such as molding, welding, inserted into slots defined in the B surface 116, by clips, by adhesive, or any other mechanical attachment. Likewise, the resilient member 114 may be fabricated of any suitable resilient material, such as plastics or polymers, spring steel, and the like.

Figure 2:
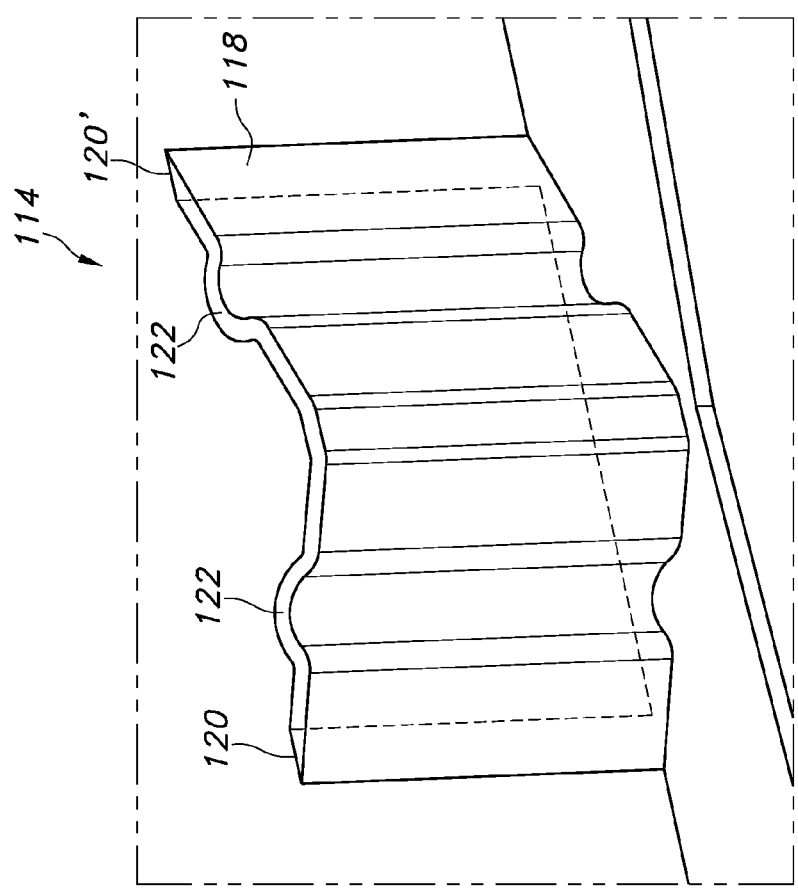
FIG. 2 depicts a resilient member for the license plate bracket of FIG. 1.
Figure 3:
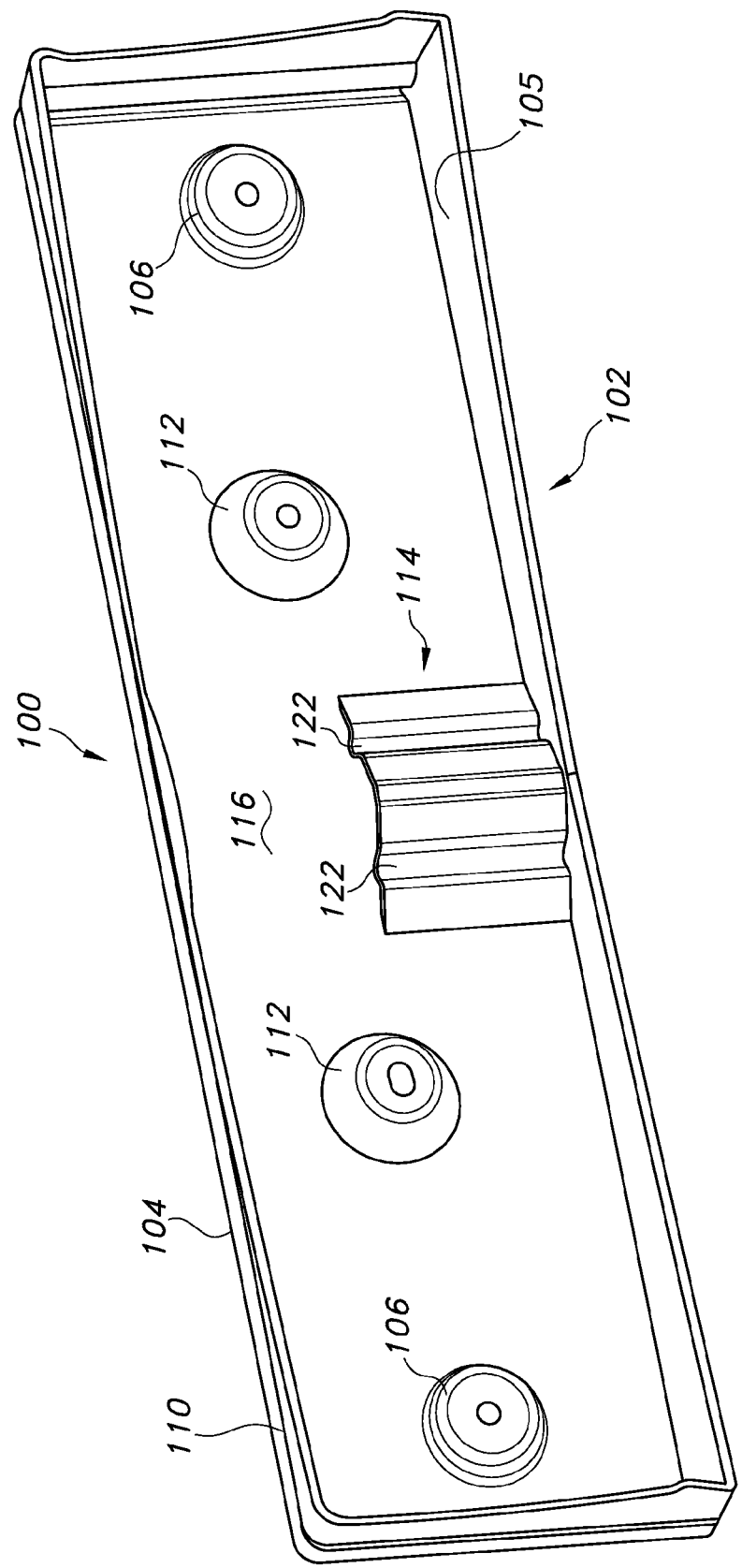
FIG. 3 depicts an alternative embodiment of the license plate bracket of FIG. 1.

With reference to FIG. 2, as shown the resilient member 114 includes an arcuate body 118 which as will be appreciated functions substantially in the manner of a leaf spring to assist in cushioning and dissipating the energy of impacts to the bracket 100. The opposed ends 120, 120' of the body 118 are attached to the bracket B surface 116. Optionally, one or more resilient member notches or grooves 120 may be defined in the body 118, to further increase the resiliency of the resilient member 114. It is contemplated to provide license plate brackets 100 including one (see FIG. 3), two (see FIG. 1), or more resilient members 114 in accordance with a size of the bracket 100, the desired degree of resiliency provided on impact, the dimensions of a license plate to be attached to the bracket 100, etc. This allows distribution of the resilient members 114 and attachment to the bracket 100 in any desired configuration, without requiring any modification to a fascia A surface (not shown) or to the bracket body 102. In turn, as will be appreciated the specific configuration of the resilient members 114 (height dimension, width dimension, degree of curvature of body 118, etc.) may vary according to the license plate bracket 100 dimensions, the degree of resiliency desired to be imparted to the resilient members 114, and the dimensions of the spacing defined between the bracket body B surface 116 and a fascia A surface (not shown in this view).

Figure 4:
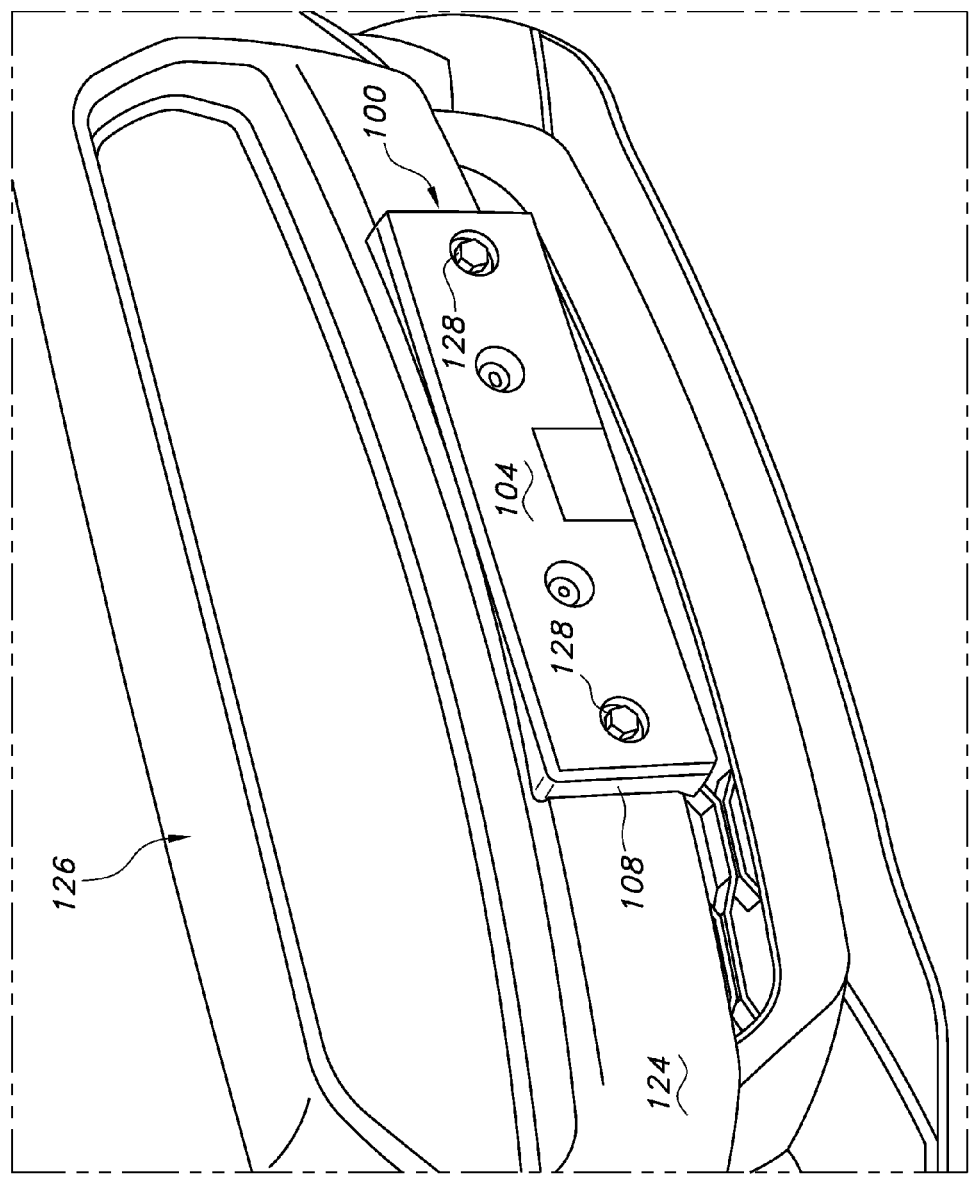
FIG. 4 depicts a license plate bracket according to the present disclosure attached to a vehicle fascia.
Figure 5:
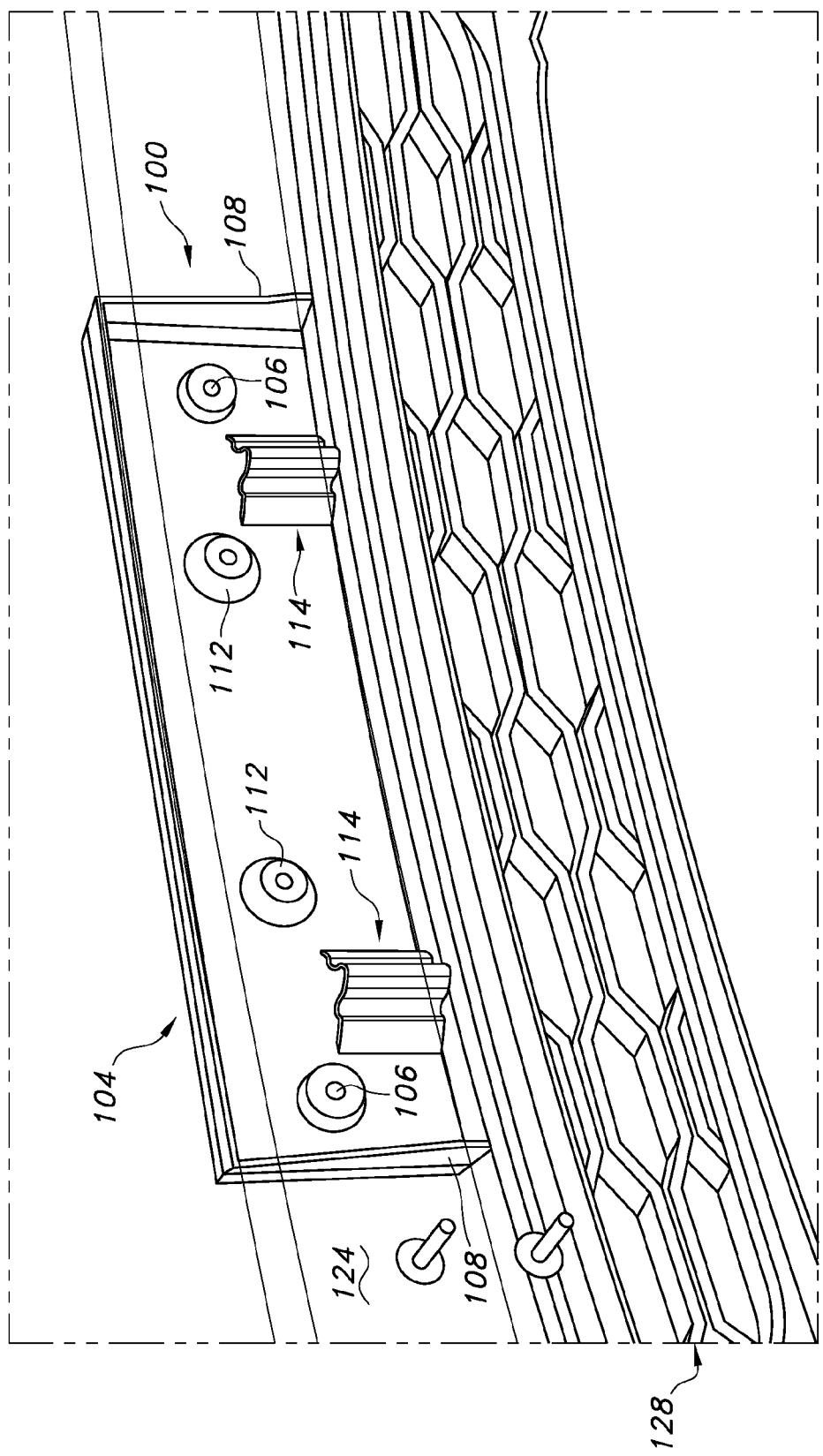
FIG. 5 depicts a rear view of the license plate bracket of FIG. 4.

In use (see FIG. 4), the described license plate bracket 100 is secured to a fascia 124 of a vehicle 126, such as by any suitable fastener 128. As will be appreciated, the bracket 100 can be attached to any vehicle fascia 124 without modification of either the bracket or the fascia, by the simple expedient of providing cooperating fastener receivers associated with the fascia. Of course, alternative attachment methods are contemplated such as screws, snaps, clamps, clips, slots, adhesives, welding, or combinations. As shown in FIG. 5, depicting the license plate bracket 100 secured to a fascia 124 from a rear or vehicle-forward perspective, in combination the sidewall 108 and resilient members 114 provide a spaced arrangement between the fascia and the body 104 of the bracket 100.

As discussed above, the bracket 100 includes one or both of one or more notches or grooves 110 formed in sidewall 108 and one or more resilient members 114 disposed on a B surface of the bracket. As will be appreciated, during normal use the resilient members 114 provide structural support to the bracket 100. As will be also appreciated, these features contribute to resiliency of the bracket 100, such as during a low speed impact with a pedestrian or other object. In such an event, resilient members 114 and/or bracket sidewall notches or grooves 110 compress, dissipating the energy of impact and reducing the possibility of vehicle damage and/or pedestrian injury.

As an additional feature, it will be appreciated that the dimensions of the bracket body 102 need not be changed to accommodate different license plate dimensions or configurations of vehicle fascia 126. Instead, the manufacturer need only alter the specific placement and/or dimensions of the resilient members 114 to accommodate different license plate dimensions and/or vehicle models/fascia configurations. Thus, common tooling can be used to fabricate brackets 100 for use across a variety of vehicle 126 models and/or fascia 124 configurations.

Still more, it is known to provide various fascia-mounted sensors which emit and receive signals to provide various functionalities to the motor vehicle user. As a non-limiting examples, such sensors include front-mounted autonomous cruise control (ACC; also called adaptive or radar cruise control) sensors, front-mounted obstacle sensors, front- and/or rear-mounted pedestrian/obstacle detection sensors, and others. Because a license plate bracket can interfere with or alter signal emission or reception by such sensors, it is typically required to position and calibrate the sensors to accommodate the particular fascia/sensor/license plate bracket configuration. However, as explained above by the presently disclosed bracket 100, a single bracket body 102 design is implemented across numerous models of vehicle 128 and/or fascia 124 configurations. Therefore, a common sensor calibration procedure can be implemented across multiple vehicle 126 models and/or fascia 124 designs.

In summary, numerous benefits are provided by the described license plate bracket. As should be appreciated, the bracket can be implemented with multiple fascia designs, without regard to jurisdictional regulations regarding front license display and/or pedestrian protection measures such as front sensors. Thus, different fascia configurations do not require specific bracket designs. In turn, by utilizing a common bracket, cost savings are realized due to common tooling for producing the bracket, common testing procedures, and common calibration procedures for pedestrian protection and other sensors. Still more, repair costs for minor impacts are reduced by use of the described bracket. In turn, because the bracket is separate from the vehicle fascia, the extent of damage from a minor frontal impact can be assessed by simply viewing and/or removing the bracket, rather than requiring removal of the entire fascia as is required for integrated bracket/fascia assemblies.

The foregoing disclosure has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle license plate mounting bracket, comprising:
   a substantially planar body defining an A surface and an opposite B surface;
   the substantially planar body including a sidewall extending rearwardly from the B surface; and
   one or more dosed resilient members disposed on the body B surface;

wherein the sidewall has one or more resiliency-imparting notches or grooves therein.

2. The bracket of claim 1, wherein the one or more resilient members each include an arcuate body attached at opposed edges thereof to the body B surface.

3. The bracket of claim 2, wherein the arcuate body includes one or more resiliency-imparting notches or grooves therein.

4. The bracket of claim 1, including a single resilient member disposed on the body B surface.

5. The bracket of claim 1, including a pair of resilient members disposed on the body B surface.

6. The bracket of claim 1, wherein the one or more resilient members are attached to the body B surface by one or more of welding, adhesive, mechanical fasteners, and clips.

7. A fascia assembly for a motor vehicle, comprising:
a fascia panel; and
a license plate mounting bracket secured to a fascia panel A surface;
wherein the bracket includes a substantially planar body defining an A surface and an opposite B surface and one or more dosed resilient members defining a spaced relationship between the A surface of the fascia panel and the body B surface;
wherein the substantially planar body includes a sidewall extending rearwardly from the body B surface;
further wherein the sidewall includes one or more resiliency-imparting notches or grooves therein.

8. The fascia assembly of claim 7, wherein the one or more resilient members each include an arcuate body attached at opposed edges thereof to the body B surface.

9. The fascia assembly of claim 8, wherein the arcuate body includes one or more resiliency-imparting notches or grooves therein.

10. The fascia assembly of claim 7, including a single resilient member disposed on the bracket body B surface.

11. The fascia assembly of claim 7, including a pair of resilient members disposed on the bracket body B surface.

12. The fascia assembly of claim 7, wherein the one or more resilient members are attached to the bracket body B surface by one or more of welding, adhesive, mechanical fasteners, and clips.

13. A vehicle including the fascia assembly of claim 7.

14. A motor vehicle license plate mounting bracket, comprising:
a substantially planar body defining an A surface, an opposite B surface, and a B surface-surrounding sidewall extending rearwardly from the B surface; and
one or more dosed arcuate resilient members disposed on the body B surface;
wherein the body sidewall includes one or more resiliency-imparting notches or grooves therein.

15. The bracket of claim 14, wherein the one or more arcuate resilient members each includes one or more resiliency-imparting notches or grooves therein.

16. The bracket of claim 14, including a single resilient member disposed on the body B surface.

17. The bracket of claim 14, including a pair of resilient members disposed on the body B surface.

* * * * *

UNITED STATES PATENT AND TRADEMARK OFFICE
CERTIFICATE OF CORRECTION

PATENT NO.         : 9,988,001 B2
APPLICATION NO.    : 14/868779
DATED              : June 5, 2018
INVENTOR(S)        : Mahmoud Yousef Ghannam et al.

It is certified that error appears in the above-identified patent and that said Letters Patent is hereby corrected as shown below:

In the Claims

Column 4, Line 66, please replace "dosed" with ---closed---, and

Column 5, Line 22, please replace "dosed" with ---closed---, and

Column 6, Line 19, please replace "dosed" with ---closed---.

Signed and Sealed this
Seventh Day of August, 2018

Andrei Iancu
*Director of the United States Patent and Trademark Office*